United States Patent [19]
Lilley

[11] Patent Number: 5,259,154
[45] Date of Patent: Nov. 9, 1993

[54] LANDSCAPE BORDER

[76] Inventor: Eugene H. Lilley, 1049 Palmyra Dr., Tega Cay, S.C. 29715

[21] Appl. No.: 836,998

[22] Filed: Feb. 14, 1992

[51] Int. Cl.⁵ .............................................. A01G 1/00
[52] U.S. Cl. ......................................... 47/33; 52/102; 404/7
[58] Field of Search .................. 47/33; 52/102; 404/7, 404/40, 41

[56] References Cited

U.S. PATENT DOCUMENTS

| | | | |
|---|---|---|---|
| 2,888,779 | 6/1959 | Hostetter | 47/33 |
| 3,314,193 | 4/1967 | Chancellor | 47/33 |
| 3,777,421 | 12/1973 | Bomba | 47/33 |
| 4,905,409 | 3/1990 | Timber | 47/33 |
| 5,080,523 | 1/1992 | Steiner | 47/33 |
| 5,119,587 | 1/1992 | Waltz | 47/33 |
| 5,168,678 | 12/1992 | Scott | 47/33 |

FOREIGN PATENT DOCUMENTS

| | | | |
|---|---|---|---|
| 2841794 | 4/1980 | Fed. Rep. of Germany | 47/33 |
| 504333 | 5/1967 | United Kingdom | 47/33 |

Primary Examiner—Henry E. Raduazo
Attorney, Agent, or Firm—Ralph H. Dougherty

[57] ABSTRACT

An improved precast plastic landscape border assembly for use as yard edging, around trees, and in terracing, the assembly comprising a plurality of identical border units. Each border unit has an upper pivotal connector at one end, a connector receiver at the other end, a generally upstanding wall portion, and a stepped horizontal base plate or mower strip, the base plate preferably carrying an angled extension portion.

22 Claims, 7 Drawing Sheets

LANDSCAPE BORDER

FIELD OF THE INVENTION

The present invention relates to ornamental beds for plant husbandry, and more particularly to a precast landscape border assembly for use as yard or garden edging, around trees, and in terracing.

BACKGROUND OF THE INVENTION

Gardeners and landscapers frequently utilize border or edging material, such as fences, logs, railroad ties, bricks, concrete blocks, and the like to provide a decorative edge for a lawn or garden, or to establish a terrace, or to surround a tree, or to contain mulch. Such border items are heavy, awkward to handle and place, and when in place they frequently prevent easy cutting or trimming of grass in the vicinity, as well as cause damage to equipment, such as mowers or grass trimmers, when such equipment comes into contact with the border.

The present invention is a border assembly which utilizes a multiplicity of identical border pieces, each including a mower strip, an upstanding wall, and upper pivotal connector means.

DESCRIPTION OF THE PRIOR ART

Applicant is aware of the following patents and applications concerning garden border or lawn edger members.

| U.S. Pat. No. | Inventor | Title |
| --- | --- | --- |
| U.S. 3,373,668 | Moore | INTERLOCKING STRUCTURES FOR EDGING, PAVING, OR THE LIKE |
| U.S. 3,415,013 | Galbraith | INTERLOCKING-TYPE BORDER BUILDING UNIT |
| U.S. 3,713,624 | Niemann | FENCE GUARD |
| U.S. 3,724,128 | Tabone | PLANTER |
| U.S. 4,601,140 | Russo | LAWN EDGING SYSTEM |
| U.S. 4,809,459 | Brylla | BUILDING AND GARDEN EDGING |
| U.S. 4,869,018 | Scales | SYSTEM FORMING A SELF-IRRIGATING, RAISED BED |
| U.S. 4,934,093 | Yanna | LANDSCAPE EDGING |
| U.S. 4,969,289 | Trifiletti | GARDEN EDGING DEVICE |
| U.S. DES. 292,474 | Young | EDGING UNIT FOR GARDEN LANDSCAPING |

Previous developments in edging devices include a solid lawn or garden edge trim member with a flat surface for mower edging, the pieces being connectable and having both upright surfaces and upper horizontal surfaces. Young teaches a garden trim device to surround a tree, although his unit is not capable of other uses. Young includes anchor holes for accommodating stakes.

Trifiletti teaches garden and lawn edging devices with holes for staking the pieces into the ground, or for connecting the pieces. Trifiletti teaches a variety of configurations, including straight and curved section configurations that afford rigidity. Trifiletti requires a number of variously configured sections to achieve a complete border.

Section connectors, which differ from the connectors of the present invention, are shown in the Tabone, Russo, Scales, Galbraith, and Moore patents.

A mower strip is shown in Young, Russo, Niemann, and Brylla.

Yanna pertains to a device for retention of mulch and the like around a tree base.

Many edging systems, such as shown in Yanna or Trifiletti, require several different shapes in order for the gardener to achieve the effect sought.

The structure, operation, and result of the invented apparatus are not disclosed in the related art. None of the related art discloses a landscape border assembly in which all border units are identical, regardless of the final configuration of the border, nor does the related art disclose a border having a pivotal upper connector at its ends, and a stepped horizontal base plate.

SUMMARY OF THE INVENTION

The present invention is a landscape border or edging device in which a single shaped unit mates with as many identical units as desired to achieve the landscape border sought. No curved pieces are required, nor are multiple styles of connectors required. The gardener need only know the final linear dimension of the landscape border to obtain the necessary pieces to achieve the border result and need not lay out a complete design to determine the pieces required, including their lengths and configurations, as are required by so many of the known border devices. In addition, a generally round border, such as a tree skirt can be extended to a different diameter merely by adding pieces as necessary, yet the border will remain in a generally round configuration. Each border or edge unit has an upper pivotal connector at one end, a connector receiver at the other end, a generally upstanding wall portion, and a stepped horizontal base plate or mower strip, the base plate preferably carrying an angled extension portion.

The invented landscape border provides a means for defining the edge of a garden, for separating lawn from garden, for acting as a tree skirt, for retaining mulch or decorative materials such as pine needles or bark therein, and in terracing. It can also serve as a flexible border for sidewalks and driveways.

OBJECTS OF THE INVENTION

The principal object of the present invention is to provide an improved edger/border/retainer member for use in landscaping and plant husbandry.

A further object of this invention is to provide border/retainer means for retaining mulch or the like around plants or trees.

Another object of the invention is to provide, an edge or border assembly for a lawn or garden which is light in weight and easy to handle and position.

Another object of the invention is to provide edge or border means for a lawn which enables a mower to cut the adjacent grass completely, obviating the need for a trimmer such as a WEED-EATER and preventing the damage it can cause to standard border means such as a retainer wall.

Another object of the invention is to provide edge or border means for defining a terrace edge for lawns or gardens.

It is also an object of this invention to provide an edge or border assembly which can be placed without the necessity of digging, trenching, or disturbing soil or roots of trees or shrubs.

Another object of the invention is to provide an edge or border unit having sufficient stiffness to hold its shape in all weather.

Another object of the invention is to provide an edge or border assembly which is decorative.

BRIEF DESCRIPTION OF THE DRAWINGS

The foregoing and other objects will become more readily apparent by referring to the following detailed description and the appended drawings in which.

DETAILED DESCRIPTION

Figure 1:
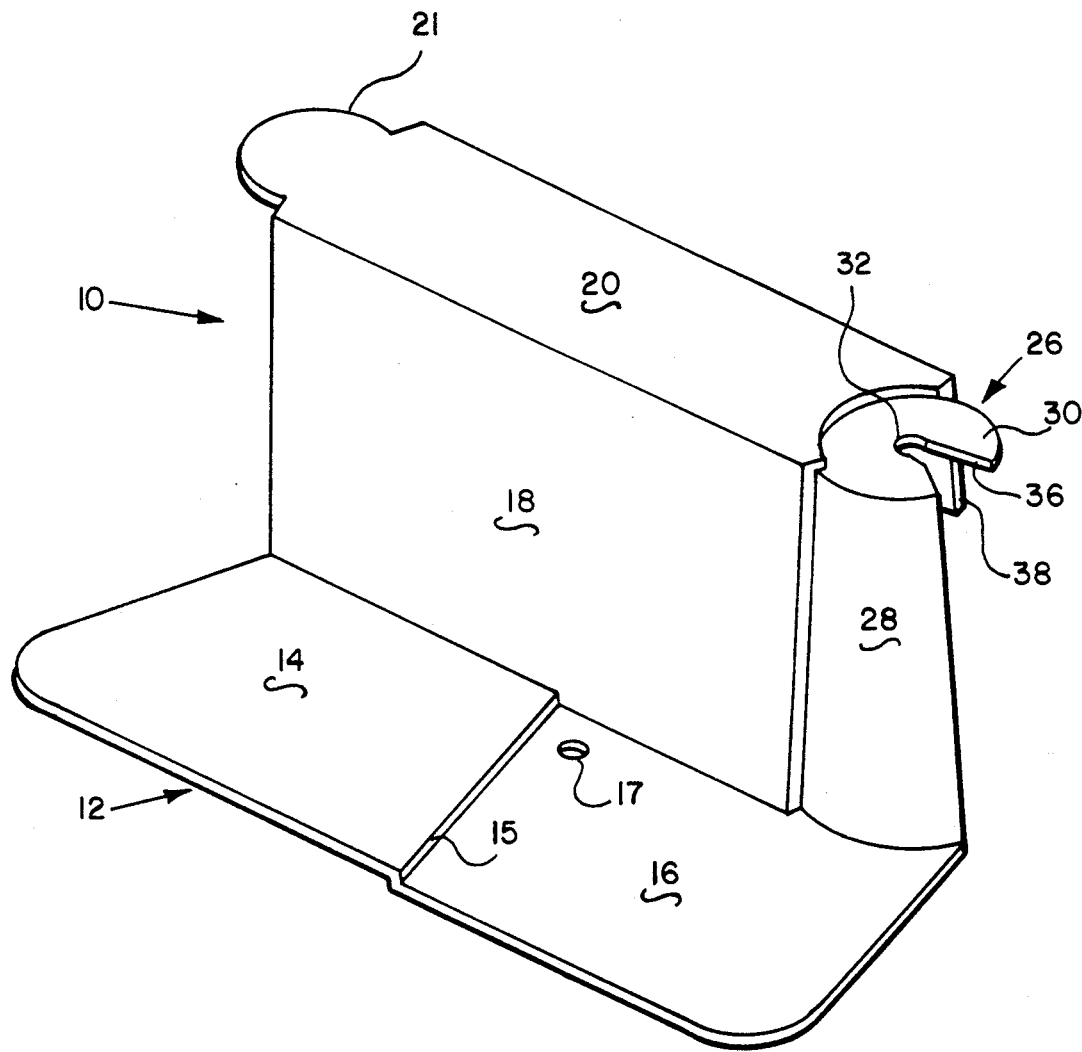
FIG. 1 is an isometric view of the preferred embodiment of a single unit of the invented landscape border assembly.
Figure 3:
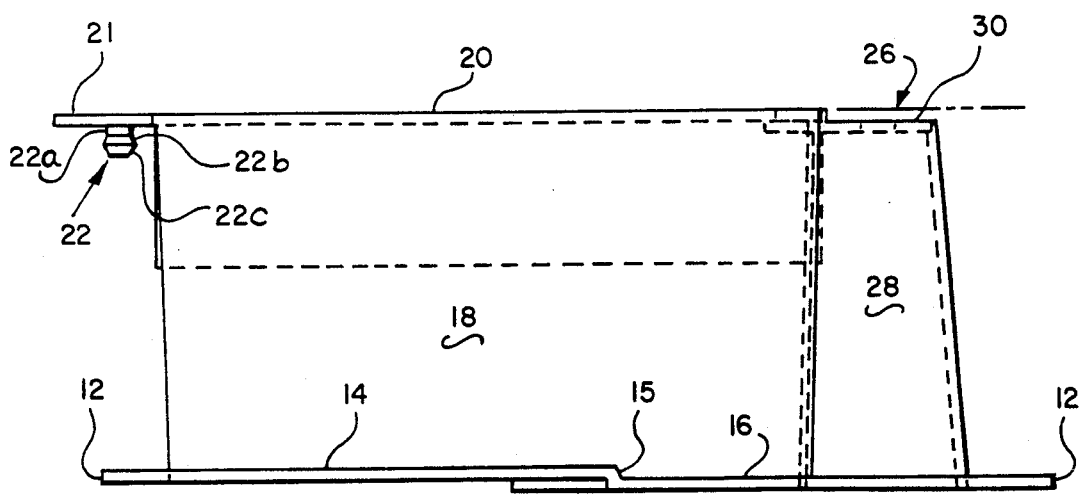
FIG. 3 is front view of the unit of FIG. 1.

Referring now to the drawings, and particularly to FIG. 1, the invented landscape border member or unit 10 includes a generally planar base 12, which base is stepped to define a higher surface 14 connected by a step 15 to a lower surface 16. A first wall 18 is fixed to and upstanding from base 12, the wall being inclined at an angle greater than a right angle from the planar surface 14, as shown in FIG. 3. An upper planar top wall 20, which is generally parallel to the surfaces 14 and 16 is fixed to the first wall or face wall 18 at its upper edge, one end of top wall 20 having a rounded extension 21 provided with a pivot which depends from the underside of top wall 20, and comprises a downwardly extending pivot pin 22. The other end of surface 20 carries a pivotal connector 26.

Figure 2:
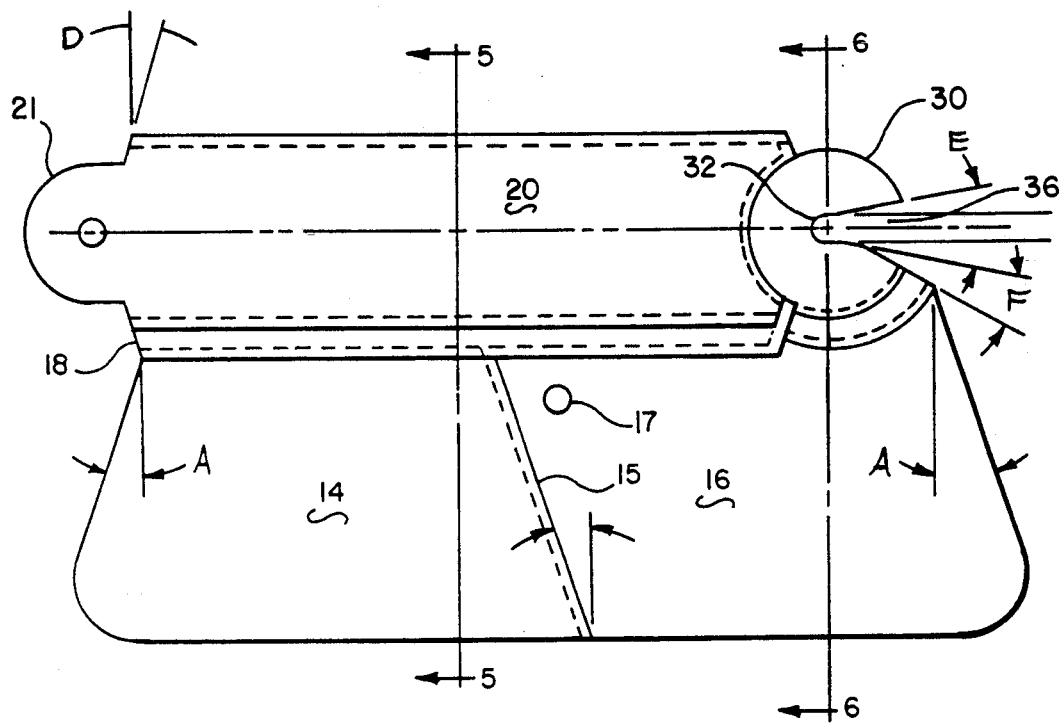
FIG. 2 is a top view of the unit of FIG. 1.

The baseplate 12 is stepped as shown with the upper surface 14 of the higher step elevated from the surface 16 of the lower step by approximately the thickness of the upper step. The baseplate is angled as shown in FIGS. 1 and 2 so that it is tapered outwardly at both ends. The preferred angle A is from 15° to 45° with the optimum angle being 17°. The angle of step 15 can be from 0° (i.e., normal to the front edge of the baseplate) to 30° in either direction, but again, the optimum angle is 17° and parallel to the right edge of the lower surface 16, as shown. A vertical hole 17 is provided in surface 16 for accommodating a stake or spike, not shown.

The face wall 18 preferably is inclined at an angle B from the vertical, i.e., from 0.5 to 20°, preferably from 1° to 10°, which is particularly advantageous for shipping, as the inclination of face wall 18 allows the individual units to be nested with other units. It should be noted that if the angle B is zero, then the wall 28 is a section of a cylinder rather than a section of a frustum of a cone.

Figure 4:
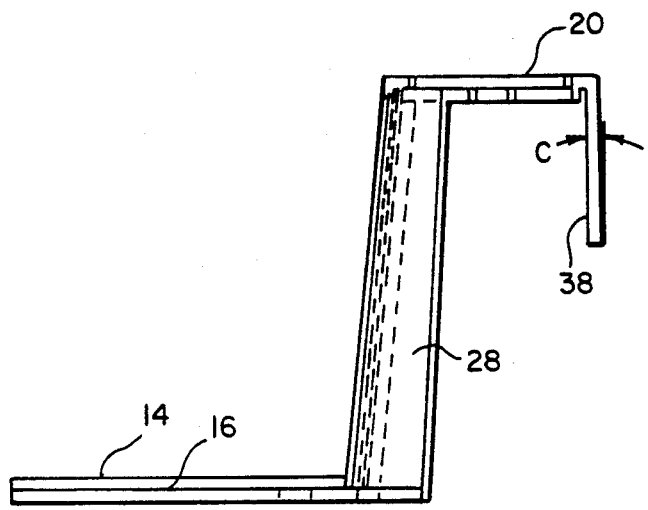
FIG. 4 is a right end view of the unit of FIG. 1.
Figures 5, 6:
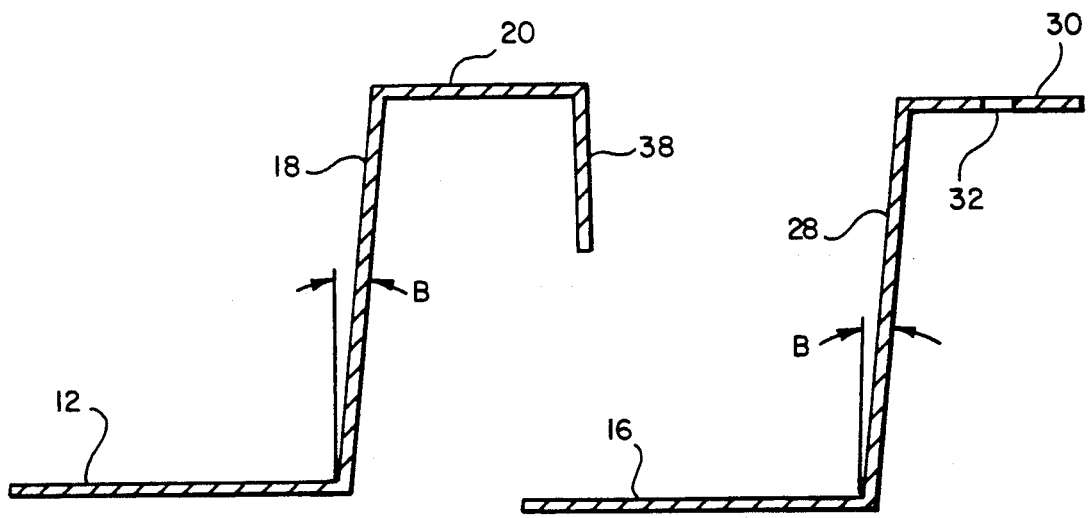
FIG. 5 is a vertical cross section taken along the line 5—5 of FIG. 2.
FIG. 6 is a vertical cross section taken along the line 6—6 of FIG. 2.

The end of upper surface 20 includes is extended to form contiguous horizontal projection 21 which is rounded, having an arcuate edge, and which carries pivot pin 22 on its lower side, the arc of projection 21 having a common center with the pivot pin. Pin 22 may be cylindrical, tapered, or partially cylindrical as at 22a with a double taper 22b, 22c, as shown in FIG. 3. The end of member 10 opposite projection 21 includes a frusto-conical wall section 28 extending from the lower surface 16 of the baseplate to an upper generally circular pivot connector plate 30 which is provided with a central vertical hole 32 therethrough and preferably a tapered entrance 36 to the hole 32 to allow a snap-in connection of the pivot pin 22. The wall section 28 is set back the thickness of face wall 18. The rear of the unit 10 may include a stiffener 38 extending downwardly from the top-plate 20 for the purpose of additional rigidity of the unit. This stiffener preferably is inclined oppositely from the first or face wall 18. Angle C, as shown in FIG. 4 is from 1° to 20°, preferably from 4° to 8°.

Figure 8:
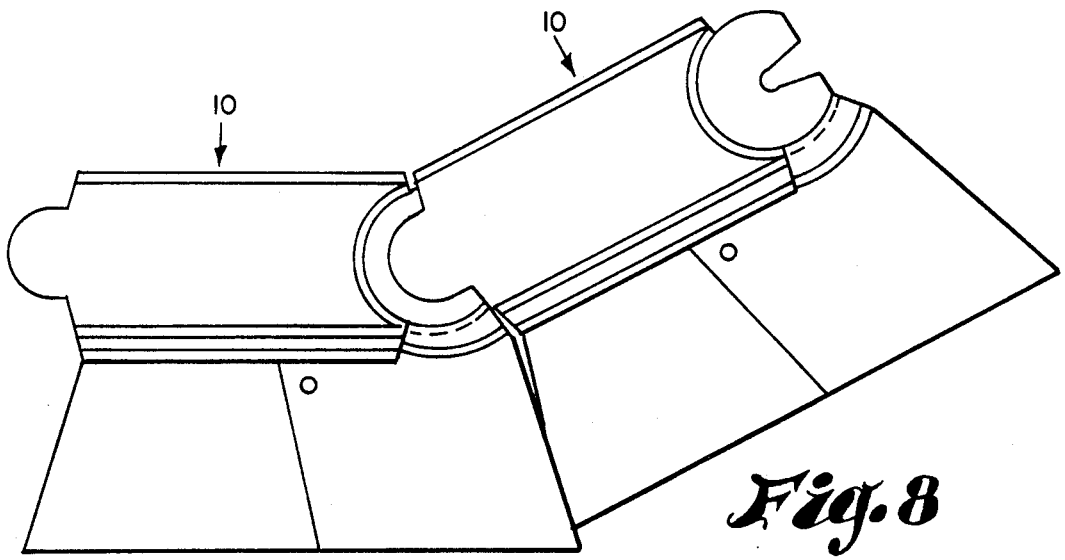
FIG. 8 is a top view of a 2-unit assembly forming an outer curve, in accordance with the present invention.

Each end 40 of top plate 20 has a taper D of from 5° to 30°, but preferably about 15°. The angles D limit the amount of deflection or angular rotation between adjacent units of an assembly, as shown in FIG. 8.

Tapered connector hole entrance 36 may have a single taper angle E, as shown in FIG. 2, or it may have a double taper including taper angle F, which allows the width of wall 28 to be narrowed.

Figure 9:
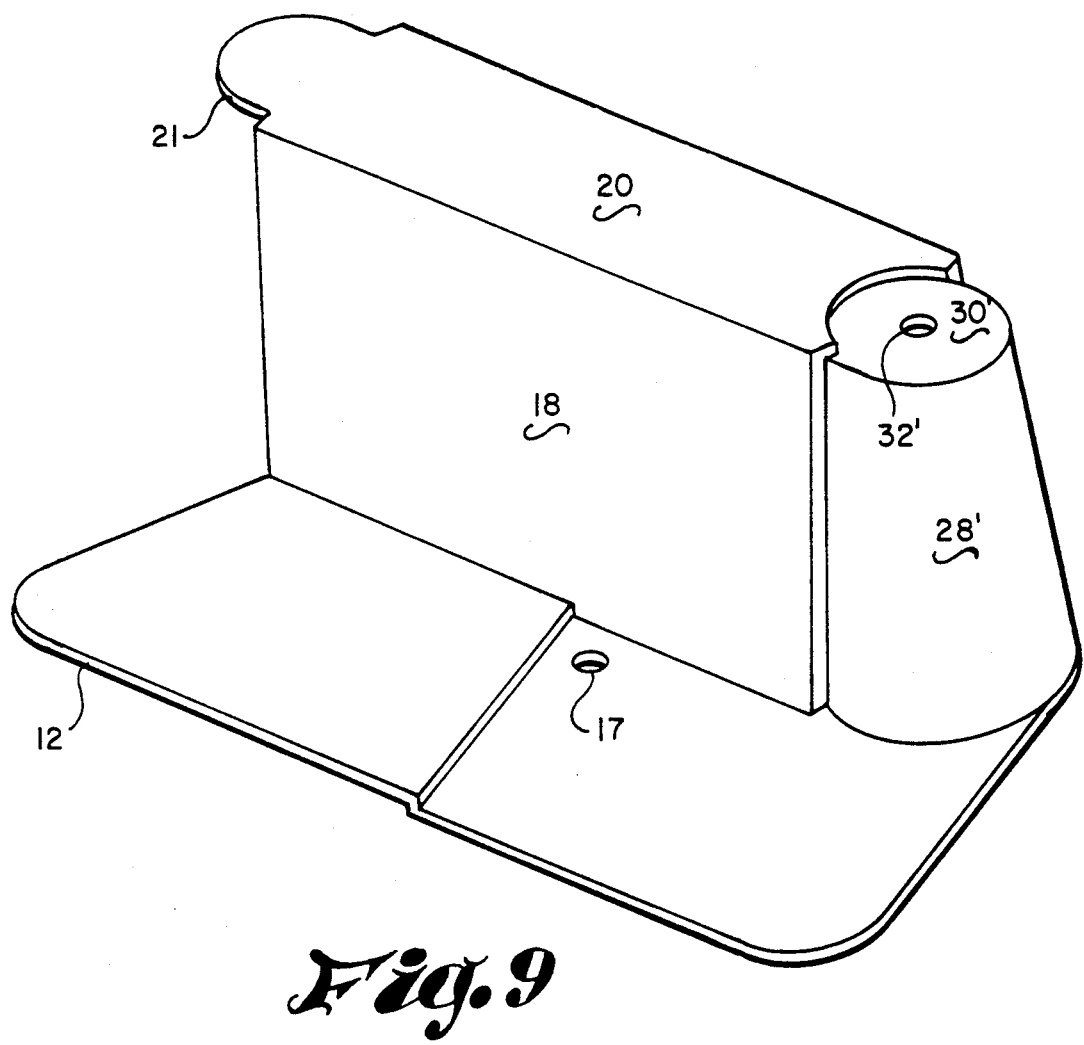
FIG. 9 is an isometric view of alternative embodiment of a single unit of the invented landscape border assembly.
Figure 10:
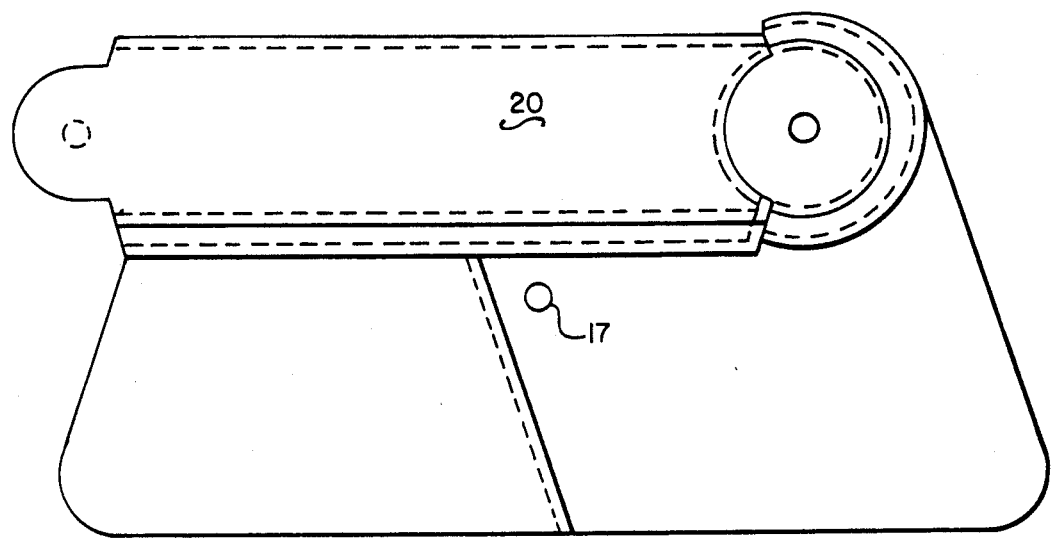
FIG. 10 is a top view of the unit of FIG. 9.
Figure 11:
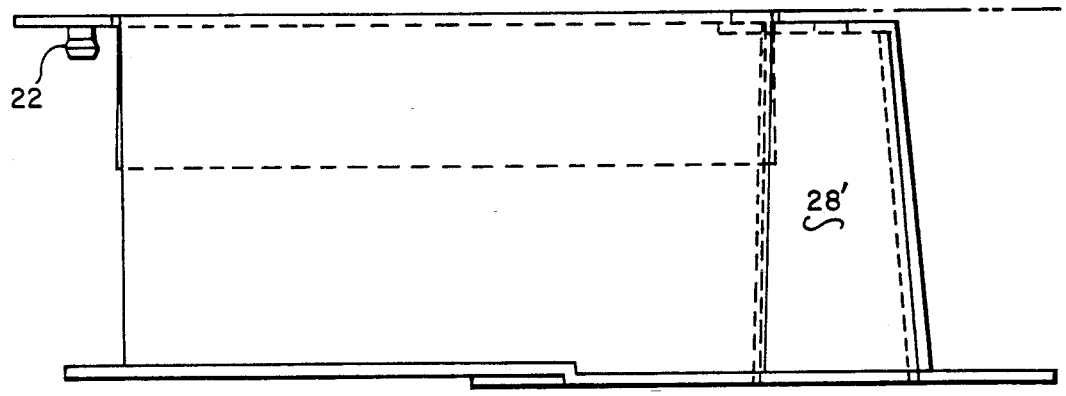
FIG. 11 is front view of the unit of FIG. 9.

The alternative embodiment shown in FIGS. 9 through 11 has a frusto-conical section 28', the curved surface of which extends to the end of the rear stiffener. The pivot connector plate 30' is circular with a central hole 32' to receive the pivot pin 22. The lower surface of baseplate 12 may be extended so the edge of the baseplate is tangential to the base of the frusto-conical section 28', as shown in FIGS. 9 through 11.

Figure 12:
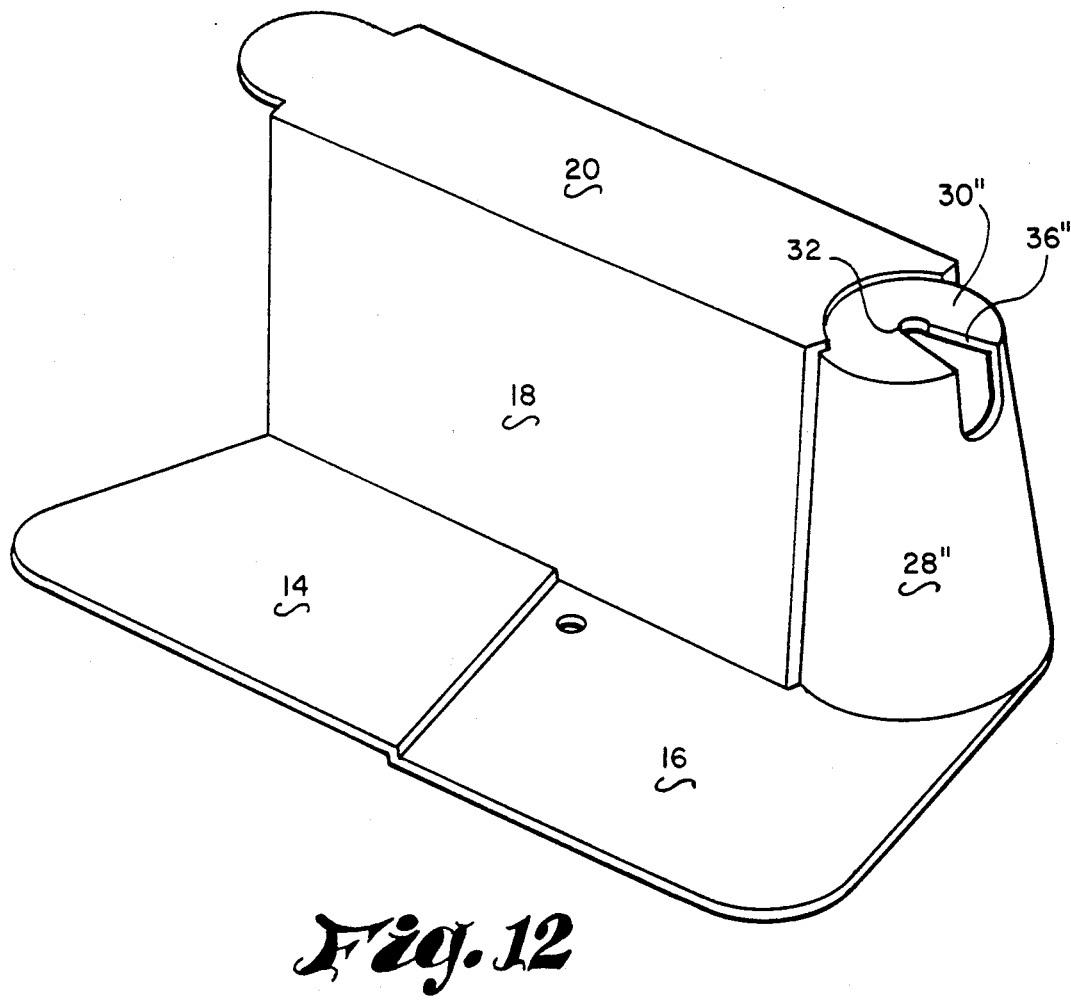
FIG. 12 is an isometric view of another alternative embodiment of a single unit of the invented landscape border assembly, which combines features of the embodiments of FIGS. 1 and 9.

The alternative embodiment shown in FIG. 12 has a frusto-conical section 28'', the curved surface of which extends to the end of the rear stiffener. The upper generally circular pivot connector plate 30'' is provided with a central vertical hole 32'' therethrough and tapered entrance 36'' to the hole 32'' to allow a snap-in connection of pivot pin 22, in the same manner as shown in FIG. 1.

The preferred material of construction is a plastic, which is resistant to ultraviolet rays, such as polypropylene, polyethylene, or vinyl. Preferably the material is reground polypropylene, which may contain up to 40% filler as a stiffener, such filler being talc, mica or calcium carbonate. Alternative materials include wood, wood by-products, metal, sheet metal, hard rubber, tile, or masonry such as vermiculite. For temporary use, the material of construction can be highly compressed peat moss, which will eventually decompose and become part of the adjoining soil.

Other suitable alternative plastic materials are: fiberglass reinforced plastic, polyvinyl chloride, chlorinated polyvinyl chloride, polyvinylidene fluoride, vinyl esters, epoxy resins, ultra high molecular weight polyethylene, fluorinated ethylene propylene, acrylonitrile-butadiene-styrene, fiberglass reinforced vinyl ester, fiberglass reinforced epoxy, polyphenylene sulfide, and fiberglass reinforced polyvinylchloride.

The exterior surface of the border unit can be patterned to look like tree bark, brick, wood, or glazed or unglazed ceramic tile, if desired. The surface of the unit can be textured by any convenient means, such as by bead blasting or shot blasting, to form an aesthetic facing. Plastic construction materials can include color tinting in the basic formulation, such as brown, green, or other desired color.

Figure 7:
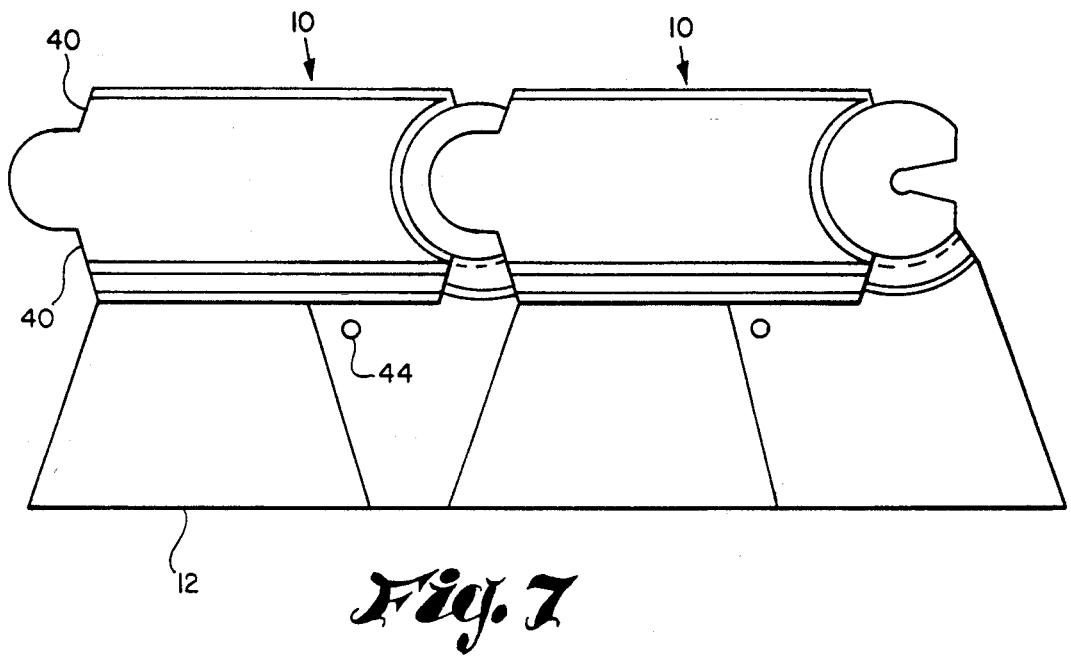
FIG. 7 is a top view of a 2-unit assembly in alignment, in accordance with the present invention.

In operation, the desired number of border units 10 is determined merely by making a linear measurement of the location in which the border assembly is to be placed. Each unit being identical in length, the linear measurement is divided by the length of one unit from pivot to pivot. The first unit is placed in the desired location, and may be staked into place in the ground by placing a stake 44 through hole 17, as shown in FIG. 7. Each succeeding unit is positioned with the pivot pin in the pin receiver, the unit 10 is then oriented properly, and staked, as necessary. The pivot pin 22 can be positioned in the receptacle 32 either from above, or by snapping it into place from the end of the unit.

SUMMARY OF THE ACHIEVEMENT OF THE OBJECTS OF THE INVENTION

From the foregoing, it is readily apparent that I have invented an improved edger/border/retainer member for use in plant husbandry, which is particularly useful for defining a terrace edge for lawns, gardens, sidewalks, or driveways, which is lightweight and easy to handle, requires no digging to emplace, which enables a mower to cut the adjacent grass completely, which obviates the need for a trimmer, preventing the damage a trimmer can cause to standard border means such as a retainer wall, and which retains mulch or the like around plants or trees.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for forming a landscape border, comprising a plurality of identical border members, each member comprising:
   - a generally horizontal base of uniform thickness, having an upper and a lower surface elevation, said upper elevation being approximately the thickness of the base higher than the lower elevation;
   - a first wall fixed to and upstanding from said horizontal base;
   - an upper planar surface fixed to the upper end of said first wall, one end of said upper planar surface being provided with a pivot receptacle, the other end of said upper planar surface being provided with a pivotal connector adapted for insertion in said pivot receptacle; and
   - a second wall fixed to and upstanding from said planar surface, adjacent and fixed to said first upstanding wall and said pivot receptacle, said second wall being rounded.

2. Apparatus according to claim 1, wherein said second wall is a cylindrical wall segment.

3. Apparatus according to claim 1, wherein each end of said base of each border member is angled outwardly.

4. Apparatus according to claim 3, wherein each end of said base of each border member is angled outwardly from 15 to 45 degrees.

5. Apparatus according to claim 1, wherein the first and second walls of each border member are inclined from the vertical from 0.5 to 20 degrees, said second wall being a frusto-conical wall segment.

6. Apparatus according to claim 5, wherein the first and second walls of each border member are inclined from the vertical from 1 to 10 degrees.

7. Apparatus according to claim 1, wherein a first member is capable of angular orientation up to 60 degrees from alignment with a second member.

8. Apparatus according to claim 1, wherein said pivot receptacle includes a vertical hole with a tapered side access to the hole, side access being from 45° to 80° of the circumference of the hole, whereby the pivotal connector may be inserted horizontally into the receptacle with a snap-in effect.

9. Apparatus according to claim 1, further comprising a stiffener member depending downwardly from the rear edge of said upper planar surface.

10. Apparatus according to claim 9, wherein the stiffener member depends downwardly and outwardly from the vertical.

11. Apparatus according to claim 10, wherein the angle of the stiffener member is from 0.5 to 20 degrees from the vertical.

12. Apparatus according to claim 10, wherein the angle of the stiffener member is from 1.0 to 8 degrees from the vertical.

13. Apparatus according to claim 1, wherein a vertical hole is provided through said lower horizontal base surface.

14. Apparatus according to claim 1, wherein the material of construction of each member is rigid plastic.

15. Apparatus according to claim 1, wherein the material of construction of each member is resistant to ultraviolet rays.

16. Apparatus according to claim 1, wherein the material of each member is selected from the group consisting of fiberglass reinforced plastic, polypropylene, polyethylene, polyvinyl chloride, chlorinated polyvinyl chloride, polyvinylidene fluoride, vinyl esters, epoxy resins, ultra high molecular weight polyethylene, fluorinated ethylene propylene, acrylonitrilebutadiene-styrene, fiberglass reinforced vinyl ester, fiberglass reinforced epoxy, polyphenylene sulfide, and fiberglass reinforced polyvinylchloride.

17. Apparatus according to claim 16, wherein the material contains a filler selected from the group consisting of talc, mica, and calcium carbonate.

18. Apparatus according to claim 1, wherein the material of construction of each member is selected from the group consisting of wood, wood by-products, metal, hard rubber, tile, masonry, and highly compressed peat moss, 19. Apparatus according to claim 1, wherein the exterior surface of the border member holds a pattern.

20. Apparatus according to claim 1, wherein the exterior surface of the border member is textured.

21. Apparatus according to claim 1, wherein the exterior surface of the border member exhibits color.

22. A method of forming a landscape border, comprising:
   (a) providing a plurality of interconnectable units, each unit having a stepped base plate, an upstanding planar face wall, an upper horizontal planar surface, a pivot pin adjacent one end of the upper planar surface and a pivot receptacle at the opposite end of the upper planar surface, and a frusto-conical wall section adjacent said upstanding wall and said pivot receptacle;
   (b) determining the number of units required for the assembly;
   (c) placing a first unit;
   (d) connecting a second unit to the first unit;
   (e) orienting the second unit with respect to the first unit; and
   (f) repeating steps (d) and (e) until the landscape border is completed.

* * * * *